H. J. CRINER.
SEED PLANTER.
APPLICATION FILED MAY 8, 1917.
1,289,120.
Patented Dec. 31, 1918.
4 SHEETS—SHEET 3.
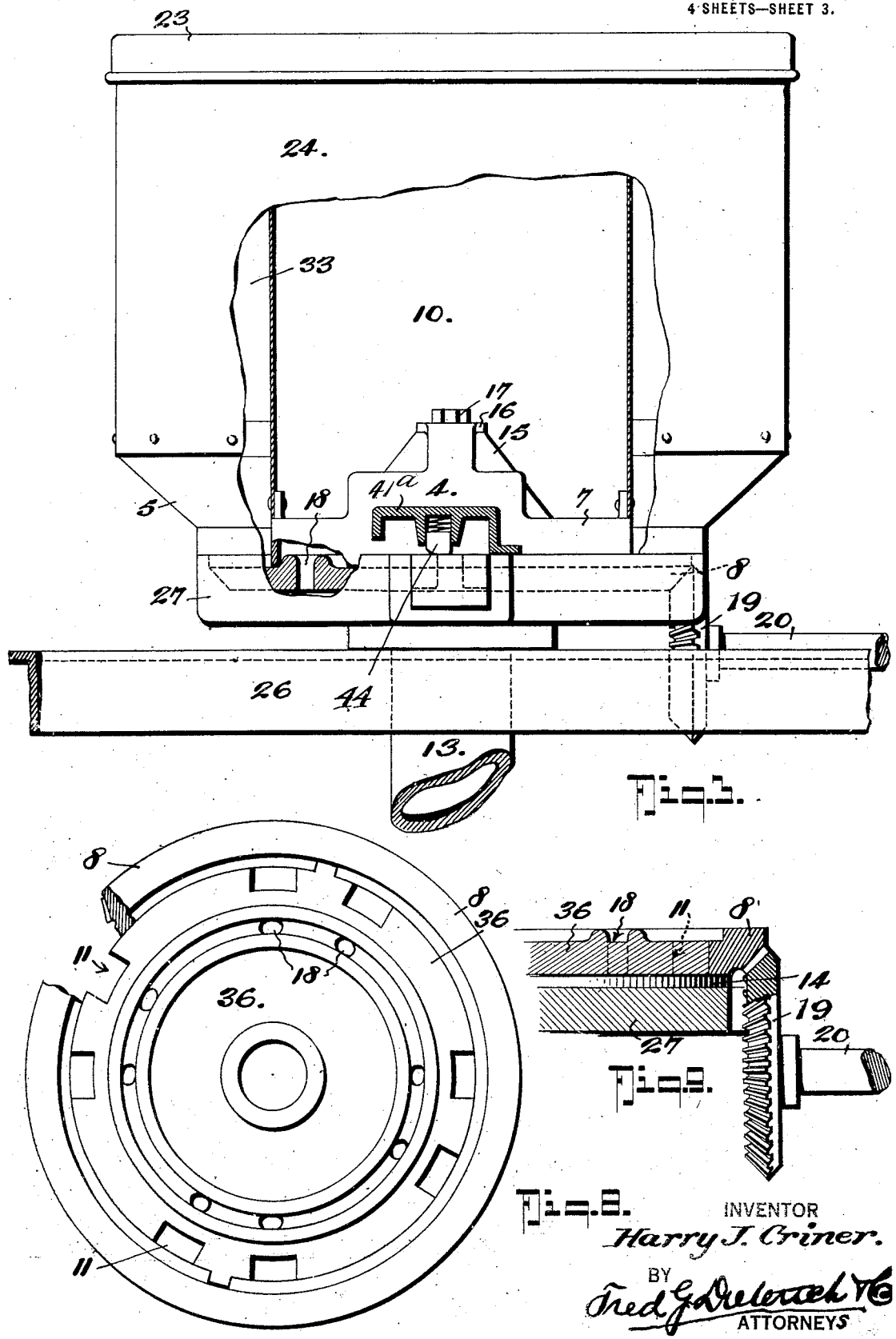
INVENTOR
*Harry J. Criner.*
BY
*Fred G. Dieterich &Co*
ATTORNEYS

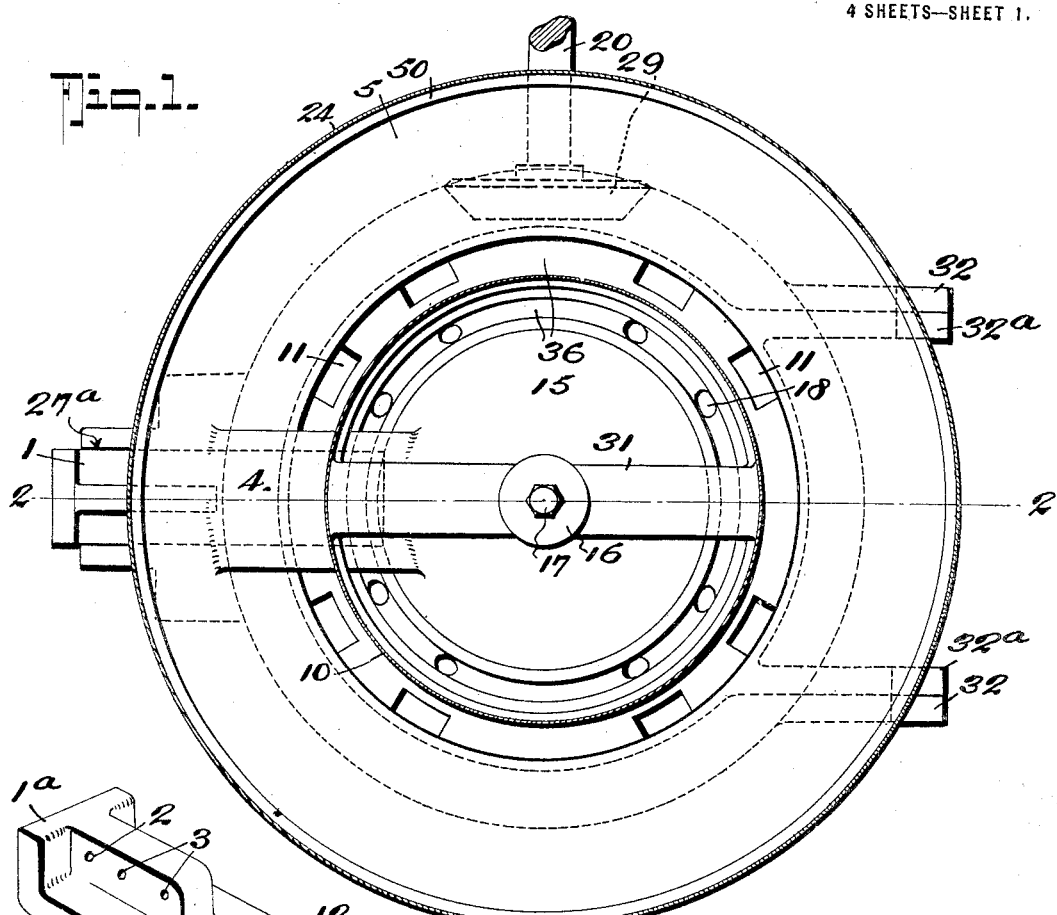
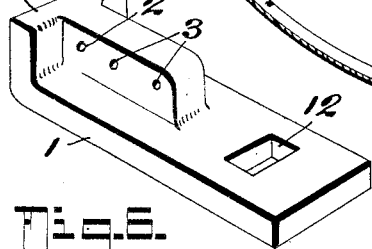
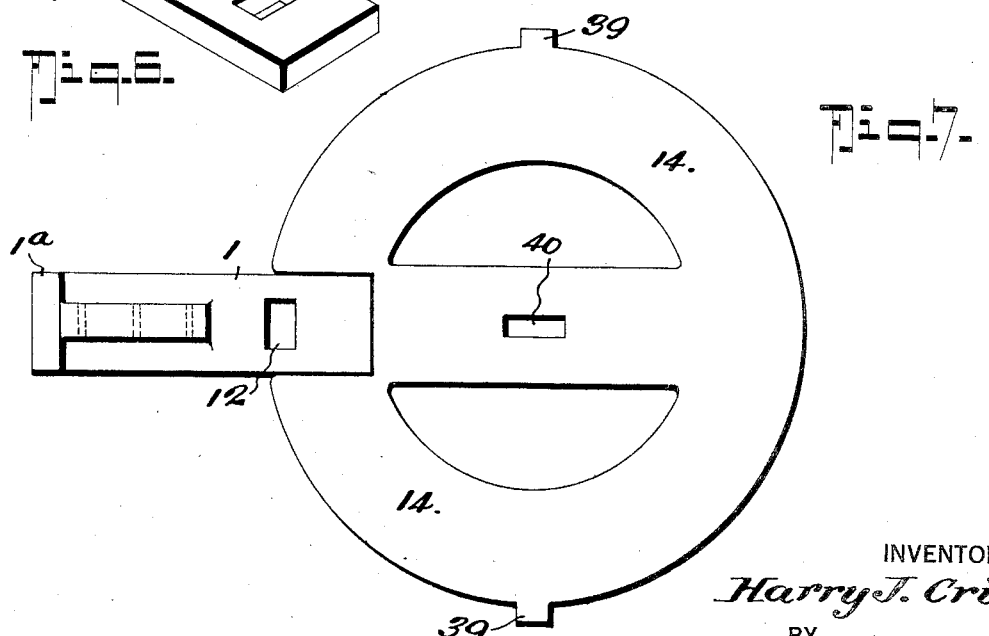

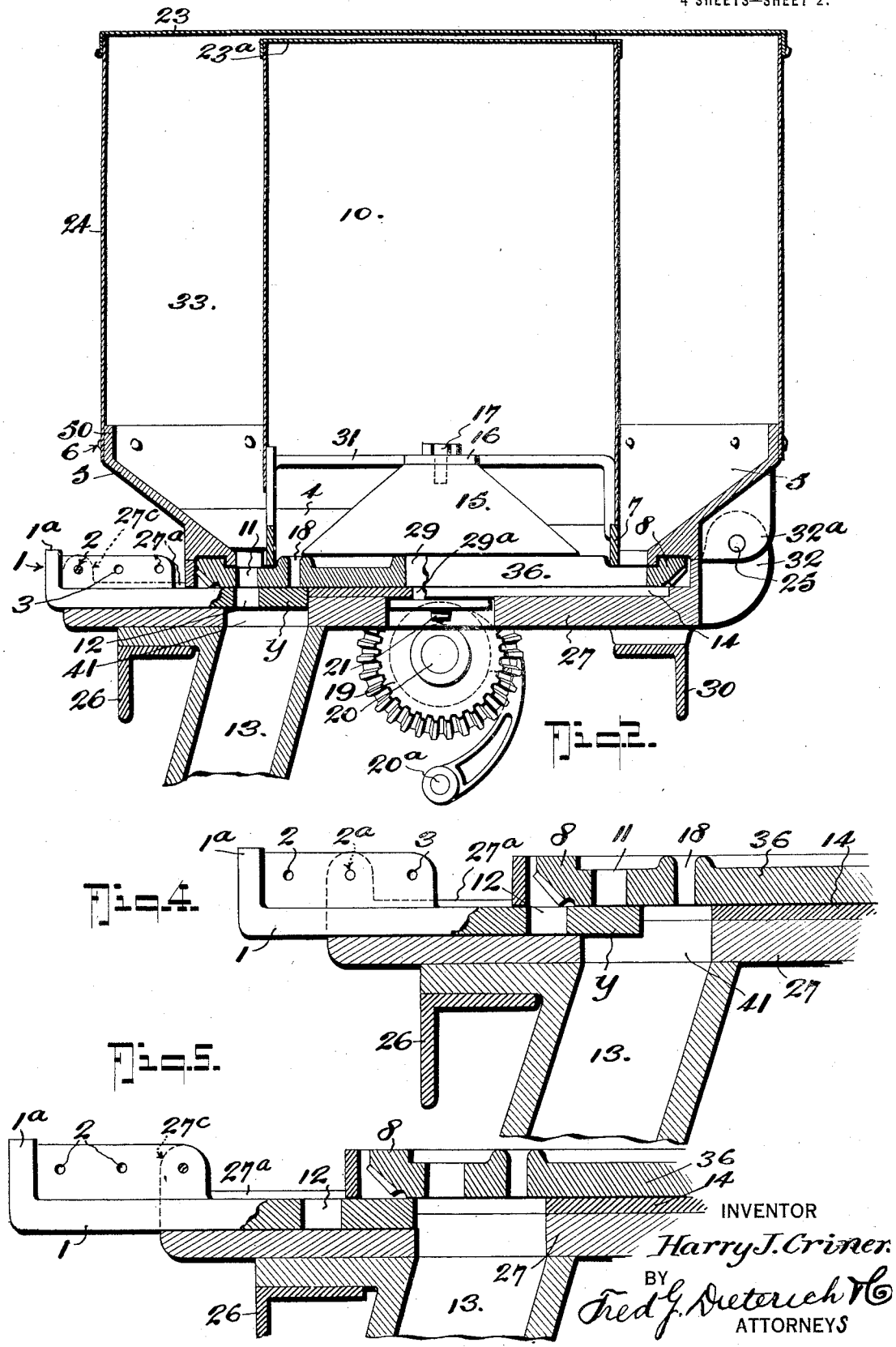

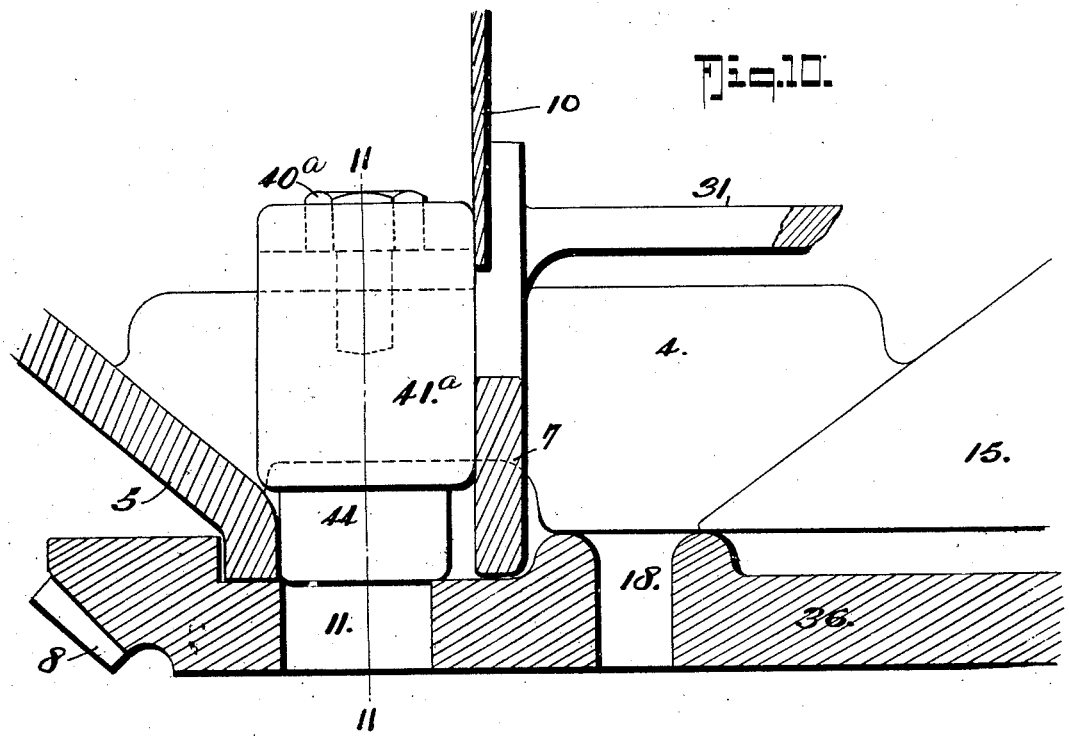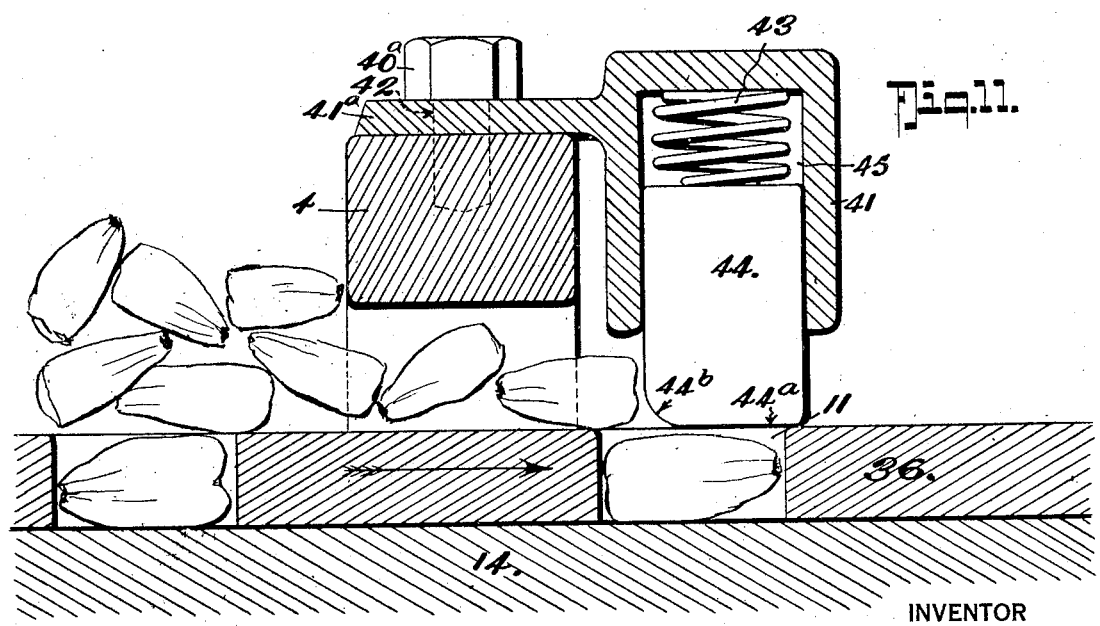

UNITED STATES PATENT OFFICE.

HARRY J. CRINER, OF BURLINGTON, IOWA, ASSIGNOR TO HAMPTON PLANTER COMPANY, A CORPORATION.

SEED-PLANTER.

1,289,120.   Specification of Letters Patent.   Patented Dec. 31, 1918.

Application filed May 8, 1917.   Serial No. 167,252.

*To all whom it may concern:*

Be it known that I, HARRY J. CRINER, a citizen of the United States, residing at Burlington, in the county of Des Moines and State of Iowa, have invented certain new and useful Improvements in Seed-Planters, of which the following is a specification.

My present invention, which relates generally to improvements in planters, is more particularly directed to providing an improved multi-compartment seed hopper construction in which is included an improved means for dropping a plurality of different kinds of seeds or seeds and fertilizer, simultaneously, and by which the seed plates are arranged for dropping one or both kinds of grain in each hill and the other kind of grain in each alternate or fourth hill, the latter preferably for pumpkins and other vine products, such as melons, &c.

Another object of my present invention is to provide, in a seed dropping mechanism of the character stated, an improved slide or cut off device for coöperating with the seeds and fertilizer compartments and which is especially adapted for controlling the different seed dropping operations before referred to and to cut off one compartment or the other or to allow the grain from both compartments to enter the planting chute at the same time.

With other objects in view that will be hereinafter explained, my present invention embodies, in a seed planter, the peculiar construction and the novel arrangement of the parts which I shall now proceed to explain in detail and define the same in the appended claims, reference being had to the accompanying drawings, in which:

Figure 1 is a top plan view of my improved seed dropping mechanism.

Fig. 2 is a vertical cross section thereof on the line 2—2 of Fig. 1.

Fig. 3 is a side elevation thereof, parts being broken away and in cross section to the better illustrate some of the internal parts, the said side elevation being viewed at right angles to that of the section, Fig. 2.

Fig. 4 is a detail longitudinal section of the regulating slide, the sub-base and a portion of the combined circular ring gear and dropping plate, the regulating slide being shown adjusted at a midway position for opening up the feed from the inner hopper or compartment.

Fig. 5 is a view similar to Fig. 3, the regulating slide, in this view, being shown as adjusted to its outermost position for opening up both compartments for feeding their contents, grain and grain, or grain and fertilizer, simultaneously, to the planter leg.

Fig. 6 is a detail perspective view of the controlling slide.

Fig. 7 is a plan view thereof and shows its coöperating relation with the ring plate, hereinafter explained.

Fig. 8 is a plan view of the combined seed dropping plate and the ring gear, the latter being broken away to the better illustrate the arrangement of the seed pockets in the rotary seed plate.

Fig. 9 is a detail view of a portion of the gear on the ring or dropping plate and the driver gear in mesh therewith.

Fig. 10 is a vertical section, parts being in elevation, of a cut out mechanism that forms a part of my complete construction of seed dropping machine.

Fig. 11 is a similar view of the parts shown in Fig. 10, the section being taken on the line 11—11 of Fig. 10.

My present invention in the practical application thereof, forms a part of a complete seed planter or soil builder of that type in which seed dropping mechanisms or plates are intermittently actuated by suitable drive devices on a check row shaft.

In my present application, I have not specifically illustrated a clutch mechanism or a check row shaft and other common parts of a planter, since they form, *per se*, no part of my present invention.

That the operation and advantages of my present invention may, however, be readily understood, reference is made to Patent No. 883,014, dated March 24, 1908, since my present construction of multi-hopper and seed planting devices are intended to serve as practical substitutes for the seed dropping mechanisms, such as are clearly disclosed in the said Patent No. 883,014.

Furthermore, while I have indicated in a general way a clutch connection between the check row shaft and the plate or seed dropping mechanism actuating shaft, the same is not specifically described or claimed, since it forms the subject matter of a copending application filed May 4, 1918, Serial No. 166,395.

Referring to the drawings, and particularly to Figs. 1, 2, 3 and 4, 24 designates the outside seed box or hopper and this hopper is of a circular shape and fixedly attached at its lower end by rivets 6, to an annular vertical flange 50 formed on the upper end of a casting 5 that is hereinafter termed the grain seed box base.

7 designates a ring shape member that holds an inner hopper 10 to its correct position, as is best shown in Fig. 2, by reference to which it will be seen that the said ring 7 carries a cross arm 31 that includes a central hub member 16 in which is received a cap screw 17 that threads into the upper end of a conical bottom or base portion 15 that slopes outwardly toward the pockets in the seed plates and operates as a continuous feeder of the grains, or other material, to the said pockets as will hereinafter be more fully explained.

The conical bottom or base 15 is cast or otherwise fixedly joined with a bridge wall 4 that is cast with the base 5 and the said bridge wall is provided for receiving any kind of a cut out device to keep more than one seed pocket filling at a time from passing under the wall, or in other words, to keep back all grains except the one or more that may be in the seed plate pockets.

36 designates the seed dropping plate, the outer or peripheral edge of which is formed with a large beveled gear 8 to which motion is imparted, at times, by a smaller beveled gear 19 fast on the driving shaft 20, hereinafter termed the plate shaft, since through the intermittent rotations of the said shaft 20 the dropping plate 36 is actuated for effecting the desired seed dropping operations, it being understood that the plate shaft 20 is driven at predetermined times by transmission that gears it with the check row shaft 20ª indicated on Fig. 2 of the drawings.

27 represents a sub-base suitably supported on cross angled irons 26—30 and, which, in practice, carries the working parts of the planting mechanism.

A ring plate 14 is located under the seed plate 36 and the said plate 14, the construction of which is best shown in Fig. 7, has a pair of diametrically oppositely disposed lugs 39—39 that extend under the ring gear 8 and serves to lift the gear 8 out of the boss on the sub-base 27 in the manner to be presently explained.

Referring particularly to Figs. 1 and 2 of the drawings, it will be seen sub-base 27 has a pair of hinged ears 32—32 that coact with like ears 32ª—32ª formed on the seed box base 5, and the several sets of ears 32—32ª are apertured to receive the hinged pintles 25—25, as shown.

23—23ª designate lids for the outer and inner seed boxes or hoppers 24 and 10.

The rotary seed plate 36 has a series of peripherally disposed seed pockets 11—11, the arrangement of which is best shown in Figs. 3, 4 and 5, by reference to which it will be seen that the plate 36 is also provided with an annular row of seed pockets 18 that communicate with the inner seed compartment 10 while the other or outer pockets 11 connect with the outer compartment 33.

The bridge wall 4 before referred to also forms a means for supporting a cut-off device that coöperates with the seed pockets 11 in the rotary seed plate 36, as is clearly shown in Figs. 10 and 11 of the drawings, and hereinafter specifically referred to.

29 designates a lug that is cast on the bottom of the cone member 15 and the said lug is formed with a reduced flattened portion 29ª that passes through an elongated aperture 40 in the ring plate 14, the latter being held up to the said lug 29 by a round thumb nut 21 that screws into the lug 29, the connections described being such that when the seed box base 5 is swung upwardly and backwardly on its hinges 25 and 32, the plate 14 lifts with it and, at the same time, the seed plate 36 and the gear 8 are elevated.

1 designates the controlling slide, the peculiar arrangement of which and its coöperative connection with the seed plate forms an essential feature of my invention. Slide 1 is mounted in a radially elongated groove or seat 27ª formed in the sub-base 27 in which seat is formed a single dropping opening 41 that is always in register with the grain leg or boot 13.

Slide 1 includes a single transverse pocket 12 to allow the corn or other grain to pass through the said slide into the grain chute or boot and the said slide also has an elongated rib or flange provided with a series of transverse apertures 2 and 3 and to facilitate the adjustment thereof, the outer end of the said slide is turned up to form a finger piece 1ª, as shown.

In adjusting the slide, a cotter pin is inserted through any of the holes 2 and 3 in the slide and a single hole 2ª in each of a pair of oppositively disposed ears 27ᶜ—27ᶜ on the radially extended portion of the sub-base 27, as is clearly shown in Fig. 1.

When the slide is adjusted as in Fig. 2, the pockets 11—11 in the seed plate 36, as they come around to the single outlet 12 in the slide 1, feed from the outer hopper. When the slide is pulled out one degree, that is when the next or middle hole 3 comes into register with the holes in the lugs 27ᶜ and the cotter pin is properly inserted, the slide is then positioned for opening up the feed through the inner set of apertures 18—18 for conveying grain or fertilizer from the inner hopper or box 10, and, when the slide is pulled to its third or last position, it leaves both sets of pockets 11 and 18 free for feeding two kinds of grain, or grain from one compartment and fertilizer from the other compartment, simultaneously, into the boot or grain chute 13.

From the foregoing description taken in connection with the drawings, the complete construction and the advantages of my invention will be readily understood.

The operation of my improved construction of seed dropping mechanism is simple and positive. As the plate shaft 20 is intermittently actuated, it imparts intermittent rotation to the gear 8 and the seed plate 36 and, as the said plate 36 moves around, its pockets 11 gather the corn or grain held in the outer compartment 33 while the peas or other grain, or fertilizer, in the inner compartment 10 will fill the pockets 18, carrying these pockets full of grain from the two seed hoppers under the cut off and drop the said grain through the slide plate 1 into the grain chute 13, if the said slide 1 is open for both discharges.

If slide 1 is positioned as indicated on Fig. 2, it puts the opening 12 in the said slide in line with the grain pockets 11 for the outer seed compartment or hopper 1 and the grain from the said outer hopper will drop through the slide opening 12 into the chute 13 as the pockets 11, in the dropping plate 36, successively come into register with the said slide opening 12, it being understood that while the parts explained are thus operated to plant from the outer hopper only, the pea pockets 18 that are filled with grain or fertilizer from the inner hopper or compartment 10 continue to pass around over the solid portion of the slide 1 without dropping the contents held in the pockets 18.

To plant peas or other grain from the inner seed box or compartment 10 without planting from the outside compartment 33, it is only necessary to move the slide 1 outwardly until its second hole 3 is in line with the apertured ears on the sub-base 27 to the position shown in Fig. 4 which puts the inner end of the slide outside of the pockets or openings 18, the solid portion $y$ of the slide 1 now acting as a cut off for the pockets 11 that are in line with the outside hopper or compartment 33 and thereby lets the peas or other seed from the inner hopper only to drop into the planting chute 13.

During the operation of planting from the inner hopper only, the corn or other grain is entered and fill the pockets 11 and, since the said pockets 11 are at this time cut off from the chute 13, they cannot empty or discharge through the said slide 1.

If the operator wishes to plant both corn and peas or other grain or fertilizer, in both hoppers at the same time, the slide 1 is moved outwardly again until the third hole on the slide registers with the apertured ears on the sub-base extension, as is clearly indicated in Fig. 5 which shows the slide 1 so positioned as to uncover both of the pockets 11 and 18 and hence both corn and peas or other grain or contents from both seed boxes pass through the said pockets 11 and 18 and discharge at the same time direct into the grain chute 13.

The several operations mentioned are repeated according to the kinds of grain, or grain and fertilizer that is desired to be dropped into the chute and from the chute into the ground.

The seed plate 36 turns one-fourth around while the shaft 20 makes one revolution, or in other words, the driving shaft makes four revolutions to one rotation of the seed plate; thus providing for planting the seeds as before described.

While I have shown my multi-compartment seed dropping mechanism as comprising but two concentric compartments, it is obvious that three or more of such compartments may be used by increasing the diameter of the seed or dropping plate and providing it with additional concentrically arranged pockets for coöperation with the additional compartments and arranging the slide plate for proper adjustments relatively to the said additional pockets.

The aforesaid description applies to but two compartments, convertible from grain to fertilizer and vice-versa.

Concentric seed plates may be arranged on either side to drop either one or both of two kinds of grain in each hill, or one kind of grain in every hill and the other kind in each alternate or each fourth hill, the latter for pumpkin or other vine products.

While I have illustrated and described a preferred construction of my improved seed planter mechanism, I do not limit myself to the specific arrangement of the several coöperative combinations of elements that constitute the said mechanism, since they may be readily varied or modified without departing from my invention as comes within the scope of the appended claims.

For example, while the seed hoppers are preferably arranged concentric, they may be placed side by side or near each other in a group and so arranged that the driving mechanism or main gear wheel can be placed between them similar to a corresponding arrangement of parts disclosed in the patent hereinbefore referred to.

In Figs. 10 and 11, I have illustrated in detail, a preferred construction of the cut out devices hereinbefore generally referred to and, in the said Figs. 10 and 11, 36 designates the seed plate, 15 the cone shape bottom member, 4 the bridge wall, 5 the base portion with which the wall 4 and the cone shape bottom 15 are integrally formed. 8 designates the large drive gear on the plate 36 and 11 and 18 the outer and inner seed pockets.

44 designates a metal cut off which, in practice, is a piece of steel or other metal a little wider than its thickness and the said cut out works in a vertical plane and is normally held, under the tension of a spring 43, with its nose end 44ª at all times resting on the seed plate 36 for keeping the grain or corn back from entering under it, allowing, as it were, only what is in the pockets 11 in the seed plate to pass under it and into the planting chute 13.

41ª denotes an extension casting that bolts on top of the bridge wall 4 and by which the metal cut off casting is held in position.

40ª represents a fastening bolt that passes through an aperture 42 in the casting 41ª and which screws into the bridge wall 4, as shown.

A space 45 is provided between the cut out 44 and the top of the casting 41ª which allows for the cut off to yieldingly move up into the said space 45 in case of clogging corn or other grain crowding in on top of that already in the pockets 11 and thus forcing the nose 44ª of the cut out 44 upward, and to facilitate such upward movement of the cut out, the said nose is beveled close to one edge as indicated by 44ᵇ on Fig. 1. By reason of constructing the cut-off device, as stated and shown, the said device keeps back all grains of corn or other grain or fertilizer except that embedded in the pockets 11 and which are wanted to feed or pass through the entrance into the grain chute.

What I claim is:

1. In a planter, a plurality of seed hoppers each having a set of seed passages, a rotatable dropping plate having a plurality of sets of seed passages in communication with predetermined ones of the plurality of seed hoppers, a planting chute common to all of the sets of seed dropping passages, means for imparting rotation to the seed dropping plate and an adjustable cut off mechanism for bringing either or all of the sets of the seed passages into communication with the planting chute.

2. In a planter, a plurality of seed hoppers, a rotative dropping plate common to all of the hoppers and having a plurality of sets of seed dropping pockets, one set of such pockets for each hopper, means for imparting intermittent rotation to the seed plate and other means adjustably mounted relatively to the rotative plate for cutting off either or all sets of pockets with the chute, whereby to drop the seed from any selected one of the hoppers or from all of the hoppers simultaneously.

3. In a planter, a plurality of seed holding compartments, a single rotatable dropping plate having independent sets of pockets, one for each holding compartment and normally in communication with the said compartments, means for imparting rotation to the dropping plate, a single planting chute common to both sets of plate pockets and a shiftable cut off adapted for adjustment whereby to open up either set of pockets with the chute or both sets of the pockets with the said chute.

4. In a soil building machine, a seed planting mechanism that comprises the following elements in combination; a seed base, an outer and an inner concentrically arranged hopper mounted upon the seed base, the said seed base including an inwardly and downwardly inclined portion that forms the bottom for the outside hopper, and a cone shape member that forms the bottom for the inside hopper, a rotatable seed plate common to both hoppers, said plate having a set of pockets normally in communication with the outside hopper and another set of pockets normally in communication with the inner hopper, the said inwardly inclined and the cone shape bottom members tending to direct the seed to the dropping plate pockets and means for imparting rotation to the plate at times, a planting chute common to both sets of pockets, and adjustable cut off devices adapted to bring either or both sets of the dropping pockets in communication with the planting chute.

5. In a planter of the character stated, the combination with a sub-base having a single dropping outlet, an inwardly and downwardly inclined base member hingedly connected with the sub-base, an inner and an outer hopper mounted on the inclined base member, a cone-shaped member that forms the bottom of the inner hopper, a rotative seed plate having independent sets of dropping pockets, one set for each hopper, means for imparting rotation to the said seed plate, other means for connecting the said seed plate with the inclined base member, whereby said seed plate is swung up bodily with the said inclined base member and the hoppers, and a bridge wall, the said wall and the cone-shaped member being fixedly connected with the said inclined base member.

HARRY J. CRINER.